(12) United States Patent
Kirkbride et al.

(10) Patent No.: US 9,102,477 B2
(45) Date of Patent: *Aug. 11, 2015

(54) ARTICLE DISTRIBUTION AND SORTING SYSTEM

(71) Applicant: ConAgra Foods Lamb Weston, Inc., Omaha, NE (US)

(72) Inventors: Charles Denio Kirkbride, Richland, WA (US); Greg Robert Lambier, Kennewick, WA (US); Rudy Sanchez, College Place, WA (US); Steve Crawford, Walla Walla, WA (US); David Hufford, Walla Walla, WA (US); James D. Ruff, Walla Walla, WA (US)

(73) Assignee: ConAgra Foods Lamb Weston, Inc., Omaha, NE (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/947,775

(22) Filed: Jul. 22, 2013

(65) Prior Publication Data

US 2013/0306435 A1 Nov. 21, 2013

Related U.S. Application Data

(63) Continuation of application No. 12/833,736, filed on Jul. 9, 2010, now Pat. No. 8,517,169.

(60) Provisional application No. 61/224,412, filed on Jul. 9, 2009.

(51) Int. Cl.
*B65G 37/00* (2006.01)
*B65G 47/72* (2006.01)
(Continued)

(52) U.S. Cl.
CPC ............... *B65G 37/00* (2013.01); *B65G 27/04* (2013.01); *B65G 47/19* (2013.01); *B65G 47/72* (2013.01)

(58) Field of Classification Search
CPC ........ B65G 37/00; B65G 27/00; B65G 27/04; B65G 47/19; B65G 47/5195; B65G 47/72
USPC ......... 198/359, 391, 446, 533, 565, 756–757, 198/771; 222/478
See application file for complete search history.

(56) References Cited

U.S. PATENT DOCUMENTS 3,592,336 A * 7/1971 Thurston et al. ............... 198/609
3,754,638 A * 8/1973 Mead .......................... 198/369.1
(Continued)

FOREIGN PATENT DOCUMENTS

DE 20 2004 00732 11/2004
EP 1 342 400 9/2003
(Continued)

OTHER PUBLICATIONS

International Search Report and Written Opinion dated Mar. 20, 2012, in Application Serial No. PCT/US2011/066933.
(Continued)

*Primary Examiner* — Mark A Deuble
(74) *Attorney, Agent, or Firm* — Advent, LLP; Ryan T. Grace

(57) ABSTRACT

A radial distribution system includes a base member for receiving product for distribution to a plurality of conveyors, a plurality of gate members radially-spaced around the base member and configured to move between an open position and a closed position, and a vibration member configured to vibrate the base member. The vibration causes product received on the base member to move on the base member in a substantially circular manner.

22 Claims, 6 Drawing Sheets

(51) Int. Cl.
  B65G 27/04 (2006.01)
  B65G 47/19 (2006.01)

(56) References Cited

U.S. PATENT DOCUMENTS

| | | | | |
|---|---|---|---|---|
| 3,827,578 | A * | 8/1974 | Hough | 406/182 |
| 3,918,116 | A * | 11/1975 | Valdespino | 15/3.13 |
| 4,398,612 | A * | 8/1983 | Mikami et al. | 177/25.18 |
| 4,516,644 | A * | 5/1985 | Fukuda | 177/25.18 |
| 4,569,405 | A * | 2/1986 | Oshima | 177/25.18 |
| 4,570,831 | A * | 2/1986 | Izumi et al. | 222/199 |
| 4,596,327 | A * | 6/1986 | Yamano | 198/533 |
| 4,941,565 | A * | 7/1990 | Hirota et al. | 198/601 |
| 4,966,273 | A * | 10/1990 | Sashiki | 198/601 |
| 5,207,310 | A * | 5/1993 | Maddocks | 198/370.01 |
| 5,804,772 | A * | 9/1998 | Wooldridge et al. | 177/116 |
| 5,855,269 | A * | 1/1999 | Flinton | 198/369.7 |
| 6,360,870 | B1 * | 3/2002 | Wooldridge | 198/391 |
| 7,128,204 | B2 * | 10/2006 | Baranowski | 198/752.1 |
| 7,759,858 | B2 * | 7/2010 | Jung et al. | 313/504 |
| 7,789,215 | B1 * | 9/2010 | Snyder | 198/391 |
| 8,517,169 | B2 * | 8/2013 | Kirkbride et al. | 198/757 |
| 2004/0148056 | A1 * | 7/2004 | Baranowski | 700/240 |
| 2006/0096836 | A1 * | 5/2006 | Perazzo et al. | 198/391 |

FOREIGN PATENT DOCUMENTS

| | | |
|---|---|---|
| EP | 1 478 221 | 1/2007 |
| JP | 59-053308 | 3/1984 |
| JP | S6134432 U | 3/1986 |
| JP | H04246012 A | 9/1992 |
| JP | H0665342 U | 9/1994 |
| JP | H8267017 A | 10/1996 |
| JP | H101112 A | 1/1998 |
| JP | 2001-171826 | 6/2001 |

OTHER PUBLICATIONS

International Search Report and Written Opinion dated Aug. 31, 2010, in Application Serial No. PCT/US2010/041591.

* cited by examiner

ARTICLE DISTRIBUTION AND SORTING SYSTEM

CROSS REFERENCE TO RELATED APPLICATIONS

This application claims the benefit of priority of U.S. application Ser. No. 12/833,736 filed Jul. 9, 2010, which application claims the benefit of priority of U.S. Provisional Application No. 61/224,412, filed Jul. 9, 2009, which are herein incorporated by reference in their entirety.

FIELD

The disclosure of the application is directed to article distribution systems and methods of using the same.

BACKGROUND

Various articles or products are often fed into distribution systems to transport or move those articles or product to one or more downstream processing stations. For example, in the food packaging industry, frozen French fries can be fed into a distribution system that directs frozen French fries onto one or more conveyors for packaging at a downstream location. Typically, the frozen French fries are fed onto a linear conveyor that has a series of gates at various locations along the conveyor. Each gate leads to a downstream packaging station that sorts and weighs the French fries for packaging (e.g., bagging). As the French fries are transported down the conveyor, the leading French fries enter the first open gate that is encountered. After a certain amount of French fries passes through the first gate, fewer French fries enter that gate (i.e., the first gate can close or otherwise restrict entry) and the leading French fries move further down the conveyor until they reach another open gate. Product that reaches the end of the linear conveyor without entering into an open gate can be dropped onto several different linear conveyors to change the conveying direction of the product and return the product to the beginning of the linear conveyor.

Linear distribution systems as described above, however, have a number of shortcomings. Because the gates are spread out along the length of the linear conveyor, the product is generally only fed to one gate at a time. This reduces the efficiency of the available downstream processing stations. Moreover, while product is being directed to a first gate, processing stations downstream of other gates shut down or enter a stand-by mode until the first open gates fill up with product. When these packaging stations come back online or re-start, they are more likely to jam or otherwise experience difficulties than those machines that are running more regularly.

In addition, because the upstream gates are always fed with product first the processing stations associated with those gates tend to receive significantly more product than the processing stations associated with gates further down the line. Thus, over time, the packaging stations receive unequal use and wear out at different rates.

Another problem that linear distribution systems encounter is that product must often be redirected back to the beginning of the distribution system. When product reaches the end of the linear conveyor without being directed to a gate, the product is dropped onto the various return conveyors for reintroduction on the linear conveyor. These drops can result in unnecessary breakage or damage to the product.

SUMMARY

In a first embodiment, a radial distribution system is provided for distributing product. The system can include a base member for receiving product for distribution to a plurality of conveyors, a plurality of gate members radially-spaced around the base member and configured to move between an open position and a closed position, and a vibration member configured to vibrate the base member. The vibration of the base member causes product received on the base member to move on the base member in a substantially circular manner. Alternatively, the product may be advanced in a substantially circular manner toward a gate member by rotating the base member or otherwise causing the product to move circumferentially in a non-vibrating manner.

In specific implementations, the system further includes a product directing member. The product directing member can be configured to receive product from above the base member and direct the product onto the base member. The product directing member can be substantially cone-shaped and/or it can have a plurality of segmented portions. In other specific implementation, a feed member can be configured to deliver product onto the product directing member. The feed member can include one or more openings for delivering product onto the product directing member. The feed member can also be movable.

In specific implementations, the base member can be substantially circular and/or it can include a plurality of facets. In other specific implementations, each gate member can be independently operable between the open and closed positions, irrespective of the position of the other gate members. If the base member is substantially circular, the gate members can have a curvature that conforms generally to the curvature of the base member.

In specific implementations, the plurality of conveyors can be linear conveyors configured to transport product from the base member to a downstream packaging station. Each linear conveyor can be adjacent a gate member, and oriented generally radially relative to the base member like spokes on a wheel. The gate members can be coupled to the base member or they can be separate from the base member. In some implementations, the base member can be sloped radially outward to facilitate movement of product to the gate members.

In another embodiment, a method of distributing product is provided. The method can include providing a substantially circular base member for receiving product, a plurality of linear conveyors, and a plurality of gate members positioned between the base member and linear conveyors. Product is delivered onto the base member and the base member is vibrated to cause the product to move in a substantially circular manner around the base member. One or more gate members can be opened to allow product to move from the base member to the one or more linear conveyors.

In specific implementations, the act of delivering product onto the base member can include providing a feed member with one or more openings and causing the product to move through the one or more openings to fall onto the base member. In other implementations, the act of delivering product onto the base member can include providing a product directing member that is substantially cone shaped and dropping product onto the product directing member. In other specific implementations, the method can further include vibrating one or more of the linear conveyors to transport product from the base member to a downstream packaging station.

The foregoing and other objects, features, and advantages of the embodiments disclosed herein will become more apparent from the following detailed description, which proceeds with reference to the accompanying figures.

DETAILED DESCRIPTION

The following description is exemplary in nature and is not intended to limit the scope, applicability, or configuration of the invention in any way. Various changes to the described embodiment may be made in the function and arrangement of the elements described herein without departing from the scope of the invention.

As used in this application and in the claims, the singular forms "a," "an," and "the" include the plural forms unless the context clearly dictates otherwise. Additionally, the term "includes" means "comprises." Further, the terms "coupled" and "associated" generally mean electrically, electromagnetically, and/or physically (e.g., mechanically or chemically) coupled or linked and does not exclude the presence of intermediate elements between the coupled or associated items absent specific contrary language.

Although the operations of exemplary embodiments of the disclosed method may be described in a particular, sequential order for convenient presentation, it should be understood that disclosed embodiments can encompass an order of operations other than the particular, sequential order disclosed. For example, operations described sequentially may in some cases be rearranged or performed concurrently. Further, descriptions and disclosures provided in association with one particular embodiment are not limited to that embodiment, and may be applied to any embodiment disclosed.

Moreover, for the sake of simplicity, the attached figures may not show the various ways (readily discernable, based on this disclosure, by one of ordinary skill in the art) in which the disclosed system, method, and apparatus can be used in combination with other systems, methods, and apparatuses. Additionally, the description sometimes uses terms such as "produce" and "provide" to describe the disclosed method. These terms are high-level abstractions of the actual operations that can be performed. The actual operations that correspond to these terms can vary depending on the particular implementation and are, based on this disclosure, readily discernible by one of ordinary skill in the art.

Distribution systems, such as those described below, are necessary to move product from one location to another for processing. In order to increase efficiency, it is desirable to have a distribution system that is capable of sending product to multiple processing stations at the same time. Moreover, since individual processing stations occasionally must be shut down or otherwise rendered temporarily inoperable, it is also desirable to have a distribution system that can dynamically respond to such processing needs by redirecting product from one processing station to another. The radial distribution systems described herein can permit product to be simultaneously directed to a plurality of processing stations or conveyors, and, if desired, can be useful to accumulate product and/or redirect product from inactive processing stations.

Figure 1:
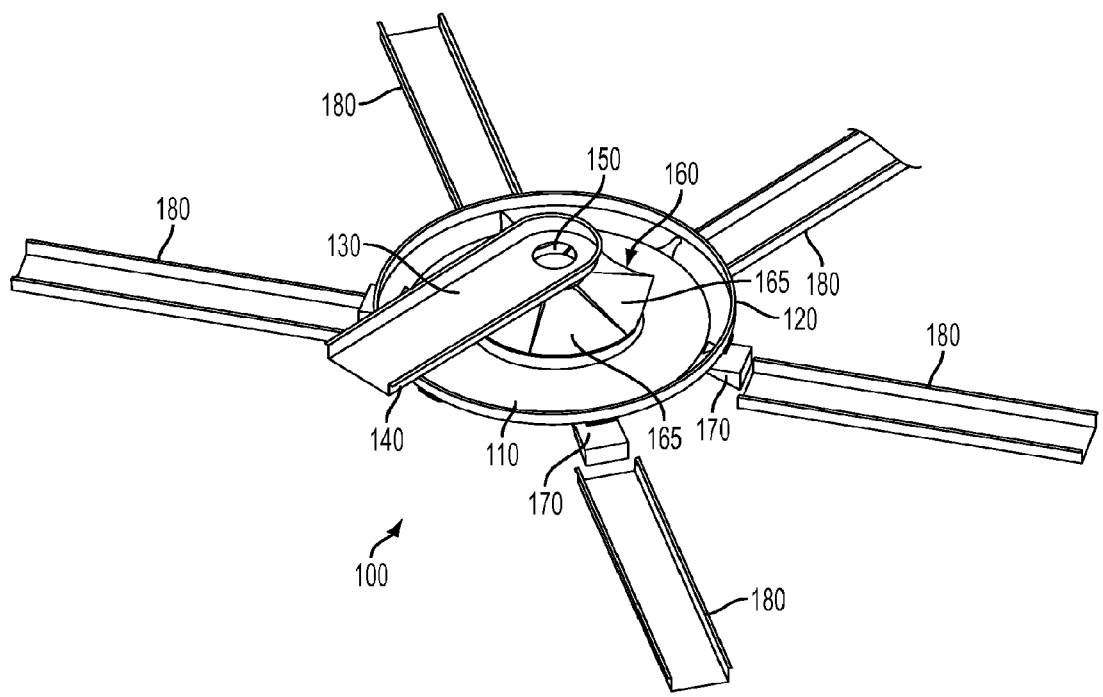
FIG. 1 shows a top perspective view of a distribution system for distributing product to one or more conveyors.

FIG. 1 illustrates a radial distribution system 100 that has a base member 110. Base member 110 can be, for example, a substantially circular bed or basin configured to receive product for distribution to a downstream processing (e.g., packaging) station. Base member 110 can include a side wall 120 that substantially surrounds the base member 110 to allow for product accumulation within the base member 110. The product that can be received in and distributed by the distribution system can be substantially any product that is suitable for distribution in the manner described herein. For example, the product can be a commercial commodity, such as a frozen French fries food product.

A feed member 130 can be configured to feed product into the base member 110. As shown in FIG. 1, feed member 130 can be positioned over a center area or portion of the base member 110. Product can be delivered to feed member 130, which in turn, delivers product to the base member 110. The structure of feed member 130 can vary. For example, feed member 130 can be a stationary arm 140 with an opening 150 positioned over the base member 110. As product moves down stationary arm 140, the product drops through opening 150 onto the base member 110. Alternatively, feed member 130 can be moveable so that the location of opening 150 can vary, allowing the product to be delivered to different areas of base member 110. The number and location of openings 150 on arm 140 can also vary. Thus, arm 140 can include multiple openings 150 that drop product onto different areas of the base member 110. In this manner, product can be distributed substantially uniformly over the surface of the base member 110. Of course, if desired, product could also be distributed in a non-uniform manner over surface of the base member 110. In one example, feed member 130 may be a vibratory (shaker) conveyor.

A product directing member 160 can be positioned on or above base member 110. Product directing member 160 can be generally cone shaped as shown in FIG. 1. The product directing member 160 can serve several functions. The product directing member 160 can help to distribute product substantially uniformly on the base member 110 and it can help to reduce breakage of or damage to product as the product drops from the overhead feed member 130 to the base member 110. The drop height from the feed member 130 to the product directing member 160 can be relatively small, which can reduce breakage. In addition, after landing on the product directing member 160, the product can be gently guided down the surface of the product directing member 160 onto the surface of the base member 110.

Figure 2:
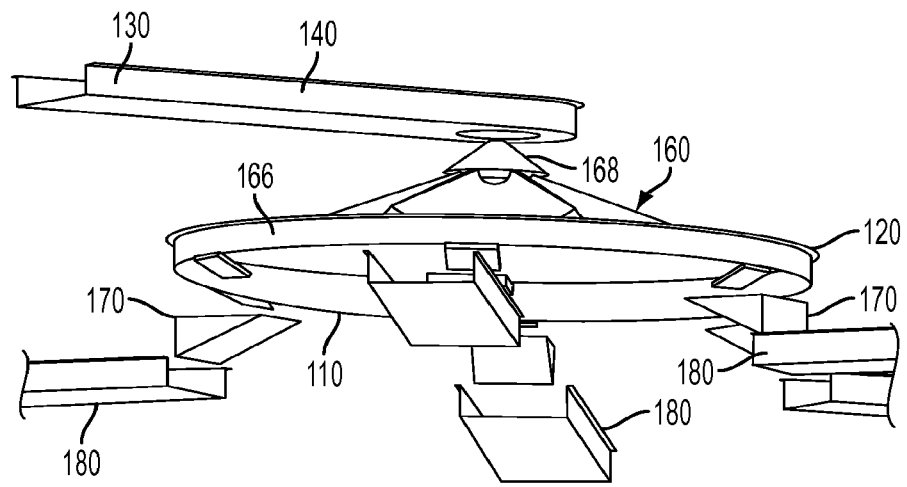
FIG. 2 shows a side perspective view of the distribution system of FIG. 1.
Figure 3:
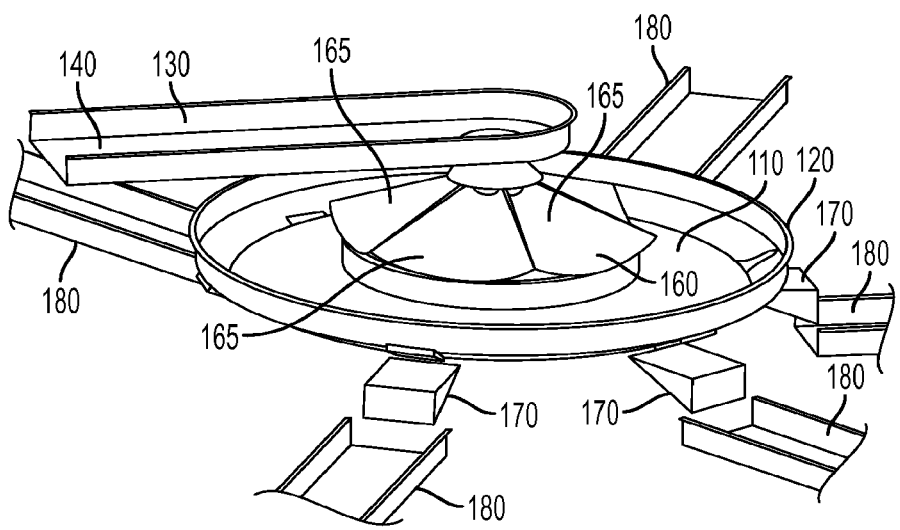
FIG. 3 shows another side perspective view of the distribution system of FIG. 1.
Figure 5:
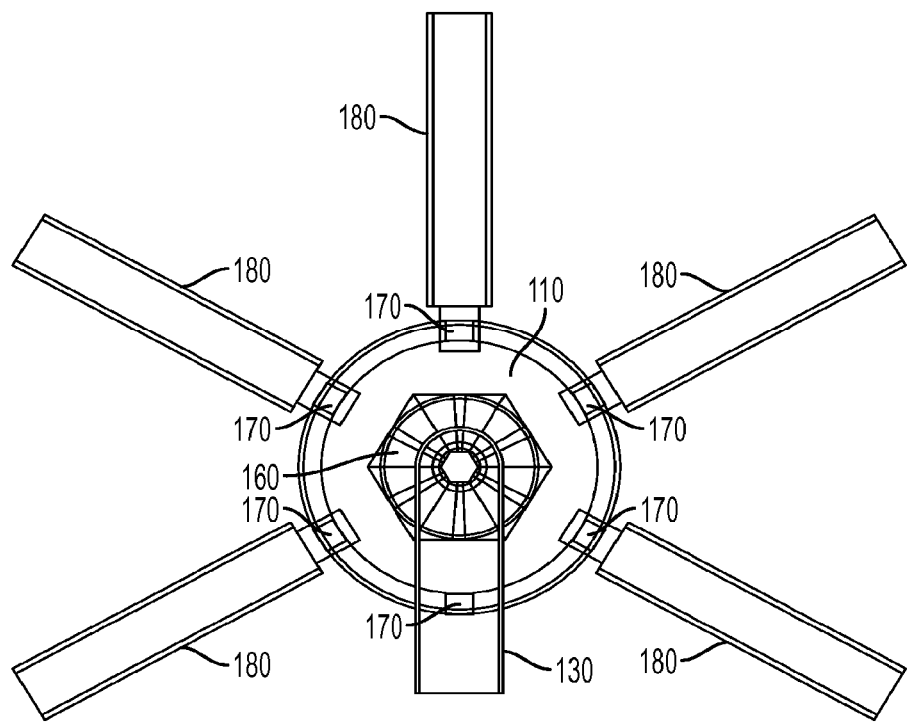
FIG. 5 shows a top view of a distribution system for distributing product to one or more conveyors.

The product directing member 160 can be formed in various configurations. For example, product directing member 160 can be completely rounded or it can be segmented as shown in FIGS. 1-3 and 5. As best shown in FIGS. 3 and 5, if desirable, product directing member 160 can have a plurality of segments 165 that direct product to one or more areas of the base member 110. These segments 165 can be uniformly shaped and uniformly distributed about the product directing member 160. Alternatively, the segments can be non-uniform in shape, size, and/or location to provide non-uniform distribution of product onto the base member 110. Product directing member 160 serves to radially distribute and disperse product fed or dropped onto a central area thereof and, with gravity assistance, to lower the product in a controlled manner. Product directing member 160 preferably has a relatively modest slope that allows the product to slide downwardly to base member 110 where it is received.

The product directing member 160 can also be formed of a single integral structure or it can comprise a plurality of separate members. For example, as shown in FIG. 2, product directing member 160 can comprise a lower (main) portion 166 and an upper portion 168. Upper portion 168 can be the same general shape as the lower portion 166, or it can be a different shape as shown in FIG. 2. An advantage of a two-part product directing member 160 might be that different upper portions could be used depending on the specific product that is to be sorted. Thus, if French fries were being distributed a first upper portion could be used; however, if whole potatoes were being distributed a different upper portion could be used. In this manner, a single machine could easily be used to distribute different sized and/or shaped products merely by switching the product directing member or a portion of the product directing member.

To provide a smooth, controlled transition from the elevated feed member 130 to underlying base member 110, upper portion 168 may be provided with a different downward slope than lower portion 160. In one example, upper portion 168 has a steeper slope than lower portion 166 to mitigate against breakage that may occur when the product drops onto an underlying surface or the moving product changes direction suddenly. Upper portion 168 diverts the free falling product in an impact-reducing manner to give the falling product a horizontal direction component (as well as a downward vertical direction component). Lower portion 166, with its shallower slope, in turn further reduces the vertical direction component to slow down the product's vertical rate of travel as it is received by base member 110.

A plurality of radially-spaced gate members 170 can be positioned around base member 110. Gate members 170 can be opened to allow product to pass through an opening in the base member 110 (and/or side wall 120) and onto a conveyor 180 aligned with each gate member 170. Each conveyor 180 can be configured to move product from the area of the gate members 170 to a downstream processing station including for example a weighing and packaging station.

It will be appreciated that the product flow is changed and dispersed from an essentially linear horizontal flow on feed member 130 to one in which the product is dispersed radially outwardly and lowered in elevation to feed multiple outlet gate members 170, preferably by controlling the drop of the products in more than one progressive incremental step in which the product's angle of approach to a horizontal plane aligned with the gate members becomes shallower with each step.

Figure 4:
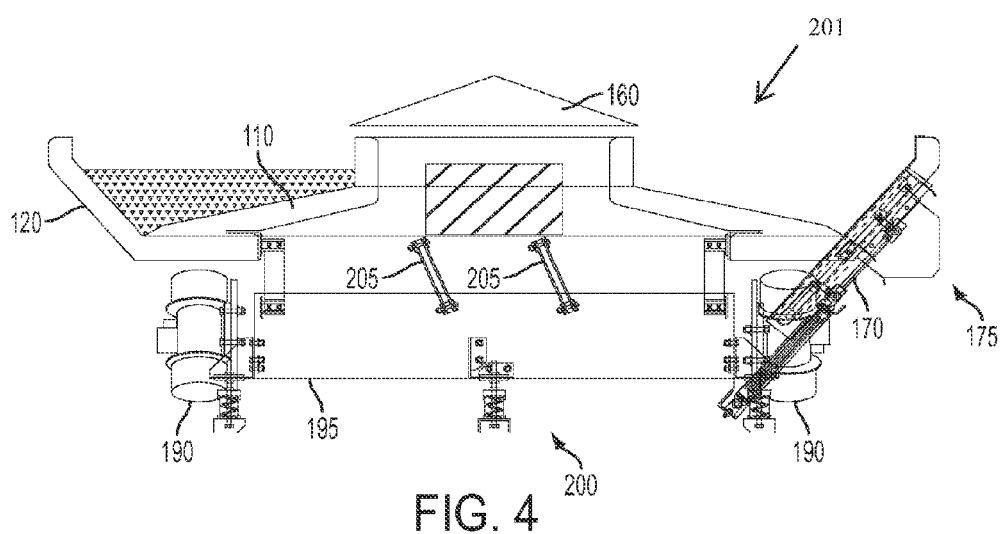
FIG. 4 shows a schematic side view of a distribution system that has a vibratory mechanism.

FIG. 4 shows an example advancement member 201. In an exemplary embodiment shown in FIG. 4, a base member 110 can be vibrated in a circular manner using rotary electric drives. In this embodiment, one or more rotary electric drives 190 can be attached to a frame 195, which is in turn attached or connected to base member 110 via springs 205. Upon activation of the rotary electric drive 190, the frame 190 is driven so that it causes springs 205 to resonate and vibrate the base member 110 in a circu8lar manner. This circular vibratory movement causes product received on the base member 110 to move in a circular motion around the base member 110.

The vibration of the base member 110 helps to keep product evenly distributed on the base member while moving the product towards distribution points (e.g., open gates). Accordingly, as shown in FIG. 4, product received on the base member 110 can move circumferentially around the base member 110 until the product encounters a gate member 170 with an exposed gate opening 175. Once product reaches an open gate member 170, it exits the base member 110 through the gate opening 175 and moves onto the adjacent conveyor 180 (see, e.g., FIG. 1). Conveyor 180 can be any known conveying mechanism, including a linear vibration (or so-called "shaker") conveyor. In another example of advancement member 201, the base member itself can be rotated to move the product in a circular manner toward the gate members. In yet another example of advancement member 201, the product can be moved on the base member toward the gate members through non-vibratory means by, for example, using a rotating arm to sweep the product in a circular motion.

Thus, in operation, product can be deposited on the product directing member 160 (e.g., a cone), from where it slides down onto the base member 110. Base member 110 can be angled or sloped to facilitate movement of the product towards the opening 175 of the gate member 170. In addition, the downwardly angled or sloped floor of the base member 110 preferably terminates at an upwardly sloped floor section to form an annular trough and provides a sloped side wall that facilitates circular product flow. Each of the gate members 170 can be separately (individually) opened and closed. Accordingly, if there is a problem with one of the downstream processing stations, the corresponding gate controlling product flow to that processing station can be closed to prevent additional product from being directed to that station. Because the base member 110 is configured to move product in a circular manner around the base member 110, the closure of one or more gate members 170 need not significantly affect the distribution operation since product can simply be diverted to the next open gate member. Moreover, if all gate members 170 are closed at one time (or there are otherwise not enough open gate members to keep up with the amount of product being fed onto the base member), product fed onto the base member 110 can accumulate in the basin of the base member 110 until one or more gate members are opened/reopened to permit distribution of the product from the base member 110.

Various configurations for opening and closing gate members 170 can be used. For example, each gate member 170 can be mounted and/or coupled to a gate air cylinder 200, which is configured to move gate member 170 downward to reveal gate opening 175. Alternatively, gate member 170 can be slid open in another direction (e.g., upwards or sideways) and/or configured to move between an open and closed position in other ways, such as by pivoting about a hinge member.

Because the gate members can be opened and closed independently, at any given time one or more gate members can be in an open position while other gate members are in a closed position. In addition, it may be desirable to allow a gate member to be operable in a partially opened position. The position of the gate members (opened, closed, or partially opened) can be dynamically varied during a sorting process (i.e., while product is being sorted from the base member).

In certain embodiments, the gate member can be partially opened in order to permit a sampling of product (e.g., specific-sized and/or shaped product) to pass through the gate opening. A so-called "partially opened" gate member can also include a gate member that is configured with one or more openings in the gate member to allow product to pass through the gate member when it is in an otherwise "closed" position. Thus, instead of being a gate member that is movable to a certain position to expose a gate opening, such a gate member would have one or more openings in the gate member itself. Such openings could be used to grade or otherwise sort product. For example, the openings could be sized to allow only product having certain characteristics to pass through the openings. Thus, for example, such gate members could be used to "weed-out" smaller-dimensioned French fries from a sorting processing that involved the distribution of larger-sized French fries.

To the extent that the figures identify dimensional specifications (in inches), these dimensions are merely illustrative. It should be noted that the dimensional specifications can vary depending on the product that is distributed. In fact, the optimal dimensional specifications of the device can vary significantly for a single product type (e.g., French fries) in view of natural variation of potatoes and commercial preferences for different sizes and cuts of French fries. For example, FIG. 6 illustrates an embodiment where the distribution system 100 has a distance of about 24 inches between an inner wall and an outer wall of the base member, and a height of about 8 inches from the lowest portion of the base member 110 to the top of the side wall 120.

Figure 6:
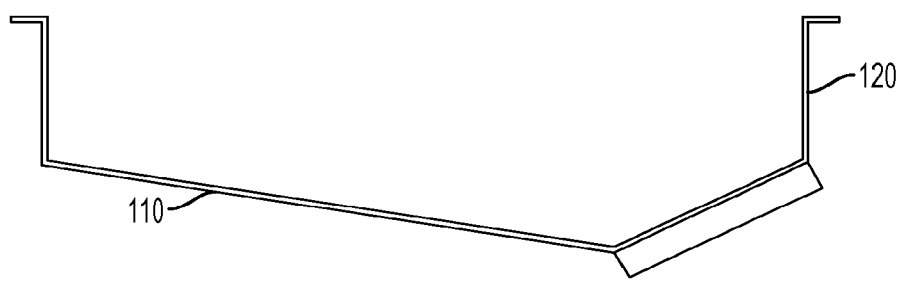
FIG. 6 shows a schematic cross-sectional side view of a base member and a gate member.
Figure 7:
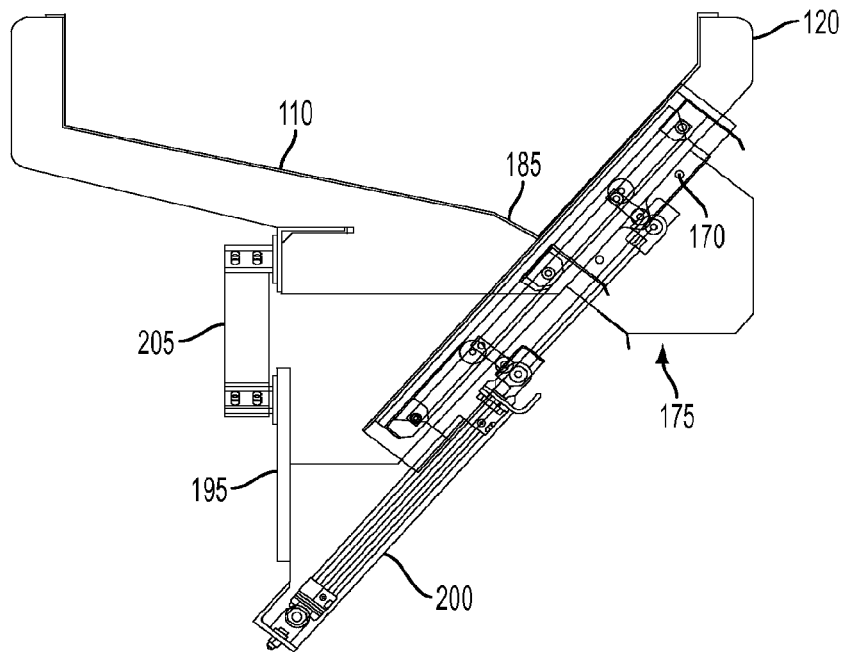
FIG. 7 shows a schematic cross-sectional side view of a base member and a gate member.
Figure 8:
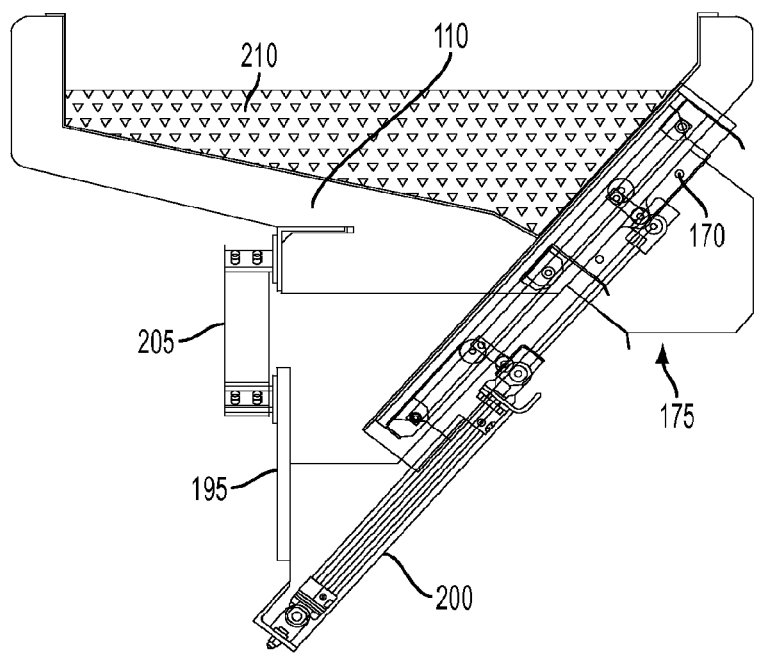
FIG. 8 shows a schematic cross-sectional side view of a base member and a gate member, with product held on the base member.

FIG. 7 is similar to FIG. 6; however, the gate member 170 extends further up the side wall 120. The location and size of the gate member 170 can vary depending on the product that is to be sorted. In addition, if the product that is being distributed is non-uniform (in size and/or shape) and the goal is to provide a random distribution of product, the gate member 170 is preferably large enough to capture product from the base member 110 at various product depths. For example, French fries can come in various sizes/lengths and it can be preferable to obtain a random distribution of sizes and shapes to send down each conveyor. However, vibration of the base member 110 tends to cause smaller parts to move to the bottom of an accumulated amount of product. Thus, over time, the vibration of the base member 110 causes smaller French fries to migrate to the bottom of the pile. Thus, it is preferable that the opening be configured to capture product from various levels of stratification, and not just from the bottom. Referring to FIG. 8, for example, it can be seen that several layers (levels) of product 210 (e.g., French fries) can be adjacent the closed gate member 170 at a time. Thus, if the gate member 170 is opened, product at the bottom of the product pile and product that is higher up can simultaneously enter into the gate opening, providing a substantially random distribution of product delivered to each conveyor.

Referring to FIGS. 4, 7, and 8, to facilitate product distribution to the gate members, the main floor portion of base member 110 can be sloped relative to a horizontal plane. As discussed above, this slope preferably is less steep or "shallower" than the slope of product directing member 160. In addition, if desirable, the floor of the base member 110 can have one or more changes in slope. For example, in an exemplary embodiment, a lip portion 185 of the base member floor can be located adjacent the gate member and outer wall and can have a slope that is greater than the slope of the rest of the base member 110. Thus, for example, while the base member may generally have a slope of less than about 20 degrees, the lip portion may have a slope of greater than 20 degrees, or, more preferably, between about 20-40 degrees relative to a horizontal plane. Such slope variations can allow product to move more efficiently from the base member through one or more circumferentially arrayed gate members.

If desired, the distribution system can also be configured to sort and/or grade product based on size, shape, and/or other physical characteristics that lend themselves to selective sorting. Thus, for example, if it is desirable to obtain smaller samples of the product contained in the base member, the gate members can be configured so that product is drawn from a lower portion of the side wall. As discussed above, smaller samples tend to move to the bottom of the accumulated product during vibration and, therefore, by positioning a gate member closer to the bottom of the accumulated product, smaller sized samples of product can be selected from the accumulated product (at least until the supply of smaller sized product is depleted from the base member). Alternatively, the size and/or shape of the gate members can vary within a single distribution system. Thus, only certain size/shape product would be able to pass through the opening associated with each gate member, thereby sorting the product by size/shape while distributing it to other processing stations.

Figure 9:
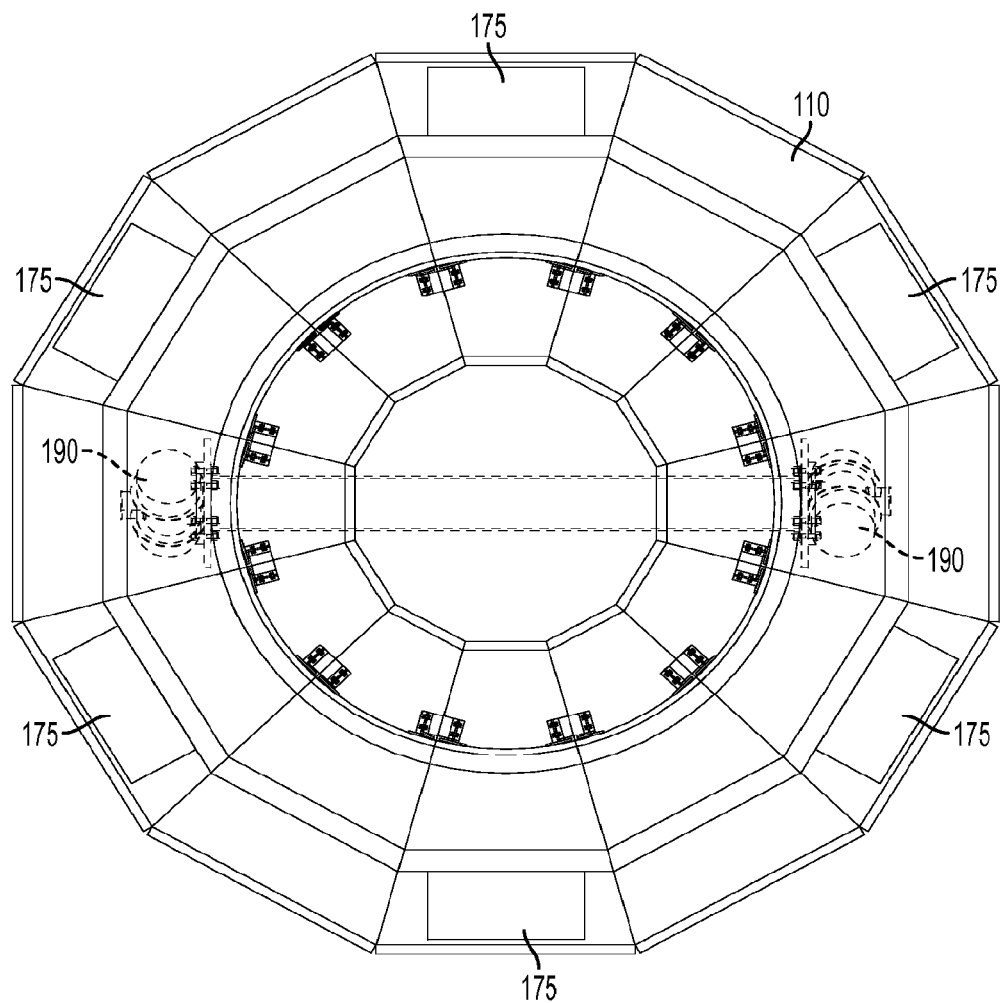
FIG. 9 shows a schematic bottom view of a distribution system that has a vibratory mechanism.

FIG. 9 illustrates another embodiment of a base member 110 that is capable of circulatory vibration as described above. Base member 110 is substantially circular, with twelve sides (facets) and six gate openings 175 spaced radially around the base member 110. Each gate opening 175 can have a width which is somewhat smaller than the width of each facet. In this embodiment, each gate and gate opening is substantially flat like the side (facet) with which it is associated. In an alternative embodiment, the side of base member 110 can be continuously curved (like a circle or oval) and each gate can have an arcuate shape to conform generally to the curvature of the side.

Product that is to be distributed in accordance with the system described herein can be processed in various manners before reaching the distribution system 100. For example, pre-distribution processing can take place upstream of conveyor 180. Such upstream processing station can include, in the case of French fries, food processing stations such as cutting and/or freezing stations and various conveying mechanisms. After leaving the upstream processing station, product can be delivered to the radial distribution system 100 for distribution to one or more downstream processing stations (not shown), such as weighing and packaging stations.

In one application of the present system, raw products (such as whole potatoes, or uncooked/unfrozen French fries) can be delivered to a distribution system 100 and then further processed at downstream processing stations after being radially distributed as discussed herein. These further processing stations could include, for example, in the case of potatoes or French fries, cutting machines, frying machines, freezer machines, and/or packaging machines As discussed above, in conventional linear distribution systems (so-called "run-around" systems), product that reaches the end of the linear conveyor without entering into an open gate is then dropped onto several linear conveyors to change the conveying direction of the product and return the product to the beginning of the linear conveyor. In contrast, when product is fed into the radial distribution systems described herein, product accumulates until it leaves the base member via an open gate. Thus, the radial distribution systems described herein do not require complex and lengthy run-around systems to re-cycle product for distribution. Product can be intentionally accumulated for a limited period of time (a few minutes for example depending on the rate of product flow and size of the base member) by closing all the gates or quasi-accumulated by closing enough gates such that the rate of product in flow exceeds the rate of product out flow. This has several benefits. The radial distribution systems described herein eliminate the multiple drop points that "run-around" systems require to re-cycle product. Minimizing the number of drop points reduces damage to product during distribution. Also, the radial distribution system can be more easily cleaned using "clean-in-place" (GIP) technology since it is a relatively compact system.

Although the embodiments above discuss using the radial distribution system to send product along a conveyor to a packaging station, it should be understood that the distribution system can be used to send product to other kinds of downstream processing stations. Thus, the distribution system can be used to distribute any type of product to a downstream processing station for any useful purpose. For example, the system could be used to distribute whole potatoes to a downstream cutting station.

In view of the many possible embodiments to which the principles of the disclosed invention may be applied, it should be recognized that the illustrated embodiments are only preferred examples of the invention and should not be taken as limiting the scope of the invention. Rather, the scope of the invention is defined by the following claims. We therefore claim as our invention all that comes within the scope and spirit of these claims.

What is claimed is:

1. A radial distribution system for distributing product, the system comprising:
    a base member comprising a downwardly sloped floor terminating at an upwardly sloped sidewall at a periphery of the base member to form an annular trough for facilitating product accumulation and circular product flow;
    a plurality of gate members radially-spaced around the annular trough of the base member; and
    a vibration member configured to vibrate the base member.

2. The system of claim 1, further comprising a product directing member, the product directing member being configured to receive product from above the base member and direct the product onto the base member.

3. The system of claim 2, wherein the product directing member is substantially cone-shaped.

4. The system of claim 2, wherein the product directing member has a plurality of segmented portions.

5. The system of claim 1, further comprising a feed member configured to deliver product onto the product directing member.

6. The system of claim 5, wherein the feed member comprises one opening for delivering product onto the product directing member.

7. The system of claim 5, wherein the feed member comprises more than one opening for delivering product onto the product directing member.

8. The system of claim 5, wherein the feed member is movable.

9. The system of claim 1, wherein the base member is substantially circular.

10. The system of claim 1, wherein the base member comprises a plurality of facets.

11. The system of claim 1, wherein each gate member is independently operable between an open and closed position, irrespective of the position of the other gate members.

12. The system of claim 1, further comprising a plurality of conveyors, wherein the plurality of conveyors are linear conveyors configured to transport product from the base member to a downstream packaging station, wherein each linear conveyor is adjacent a gate member.

13. The system of claim 1, wherein the gate members are coupled to the annular trough of the base member.

14. The system of claim 1, wherein the base member is sloped radially outward.

15. The system of claim 1, wherein the product comprises potatoes.

16. The system of claim 9, wherein the product comprises French fries.

17. A method of distributing product comprising:
    providing a substantially circular base member having an annular trough, the annual trough defining a sidewall disposed about an entire periphery of the substantially circular base member, a plurality of conveyors, and a plurality of gate members positioned between the annular trough of the base member and the conveyors;
    delivering product onto the base member;
    vibrating the base member to cause the product to move in a substantially circular manner around the annular trough of the base member; and
    opening one or more gate members to allow product to move from the base member to the one or more conveyor.

18. The method of claim 17, wherein the act of delivering product onto the base member comprises:
    providing a feed member with one or more openings; and
    causing the product to move through the one or more openings to fall onto the base member.

19. The method of claim 17, wherein the act of delivering product onto the base member comprises:
    providing a product directing member that is substantially cone shaped; and
    dropping product onto the product directing member.

20. The method of claim 17, further comprising:
    vibrating one or more of the linear conveyors to transport product from the base member to a downstream packaging station.

21. A radial distribution system for distributing product, the system comprising:
    a base member comprising a downwardly sloped floor terminating at an upwardly sloped sidewall at a periphery of the base member to form an annular trough for facilitating product accumulation;
    a plurality of gate members radially-spaced around the annular trough of the base member and configured to move between an open position and a closed position; and
    an advancement member configured to move product in a substantially circular manner toward the gate members.

22. The system of claim 21 wherein the advancement member rotates the base member about a center axis to move product with the base member toward the gate members.

* * * * *